(12) United States Patent
Carpenter

(10) Patent No.: US 6,488,459 B2
(45) Date of Patent: Dec. 3, 2002

(54) AEROSPACE FASTENER

(75) Inventor: Billy R. Carpenter, Springtown, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/801,307

(22) Filed: Mar. 7, 2001

(65) Prior Publication Data

US 2002/0127082 A1 Sep. 12, 2002

(51) Int. Cl.[7] ............................................... F16B 39/02
(52) U.S. Cl. ...................... 411/325; 411/271; 411/338; 411/366.1
(58) Field of Search ................................ 411/271, 325, 411/338, 339, 366.1

(56) References Cited

U.S. PATENT DOCUMENTS

| | | | | |
|---|---|---|---|---|
| 793,402 A | * | 6/1905 | Storsberg | 411/271 X |
| 1,075,849 A | * | 10/1913 | Partridge | 411/271 |
| 1,945,325 A | * | 1/1934 | Lloyd | 411/271 |
| 3,042,094 A | * | 7/1962 | Liljeberg | 411/271 |
| 4,874,275 A | * | 10/1989 | Gotman | 411/271 X |

FOREIGN PATENT DOCUMENTS

| FR | 675305 | * | 2/1930 | ................. 411/271 |
|---|---|---|---|---|

* cited by examiner

*Primary Examiner*—Neill Wilson
(74) *Attorney, Agent, or Firm*—Bracewell & Patterson, L.L.P.

(57) ABSTRACT

A fastener has male and female sections, each section having an elongate portion and a head with an outer diameter larger than that of the elongate portion. The elongate portion of the male section has external threads, and the elongate portion of the female section has internal threads for engaging the threads of the male section. The outer end of the male section is castellated and has a threaded cavity. The head of each of the sections receives a tool for tightening the sections together. The female section has a hole through the center of its head that aligns with the cavity in the castellated portion. A tapered, threaded lock screw is inserted into the hole and rotated to cause the threads to engage the cavity, the segments of the castellated portion deforming radially outward and causing a large normal force between the threads on the segments and the threads of the female section.

13 Claims, 1 Drawing Sheet

AEROSPACE FASTENER

BACKGROUND OF THE INVENTION

1. Field of the Invention

This invention generally relates to aircraft manufacturing and particularly relates to locking fasteners used to fasten an aircraft frame member to another frame member.

2. Description of the Prior Art

Aircraft fuselages are typically assembled by constructing a metal frame structure from beams and attaching panels to the outside of the frame. The frame gives rigidity and strength to the aircraft, and the panels form an enclosure to provide a streamlined outer surface to reduce aerodynamic drag and to protect the components carried within the frame from the exterior environment. The panels are may be riveted or adhered to the frame.

A second method of constructing a fuselage is to machine the fuselage, or a portion thereof, from a solid block of metal. The fuselage comprises strengthening members that obviate the need for a separate frame. Holes in the fuselage are provided to lighten the fuselage and to allow access to internal components of the aircraft after assembly. These holes are covered by panels affixed to the fuselage.

Composite materials are used to construct sections of aircraft, but the use has generally been limited to wing surfaces and exterior panels. Methods of construction which would provide integral frame members and limit the number of joints in a composite fuselage would allow for cost-effective manufacturing of strong, light aircraft. However, fasteners are needed to extend through the entire height of the frame members. These fasteners need to be of a locking type to prevent their loosening, which could allow the sections of the fuselage to move relative to one another and result in a catastrophic failure of the aircraft.

SUMMARY OF THE INVENTION

A fastener is provided for constructing a fuselage of an aircraft, the fastener having male and female sections. Each section has an elongate portion and a head having an outer diameter that is larger than the diameter of the elongate portion. The elongate portion of the male section is a cylindrical shaft having external threads. The elongate portion of the female section is a tubular member having internal threads for engaging the threads of the male section. The outer end of the threaded portion of the male section is castellated and has a threaded cavity.

The head of each of the male and female sections has a high-torque connector profile for receiving a tool used to tighten the sections together. The head of the female section also has a hole through the center of the head that opens into the center of the female elongate portion, the hole aligning with the center of the castellated portion of the male portion. A tapered, threaded lock screw is inserted into the hole and rotated to cause the threads to engage the interior of the castellated portion of the male section. The segments of the castellated portion are moved radially outward by the taper of the lock screw, causing a large normal force between the threads on the segments and the threads of the female portion. This force results in a large frictional force, preventing relative rotation between the male and female sections.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
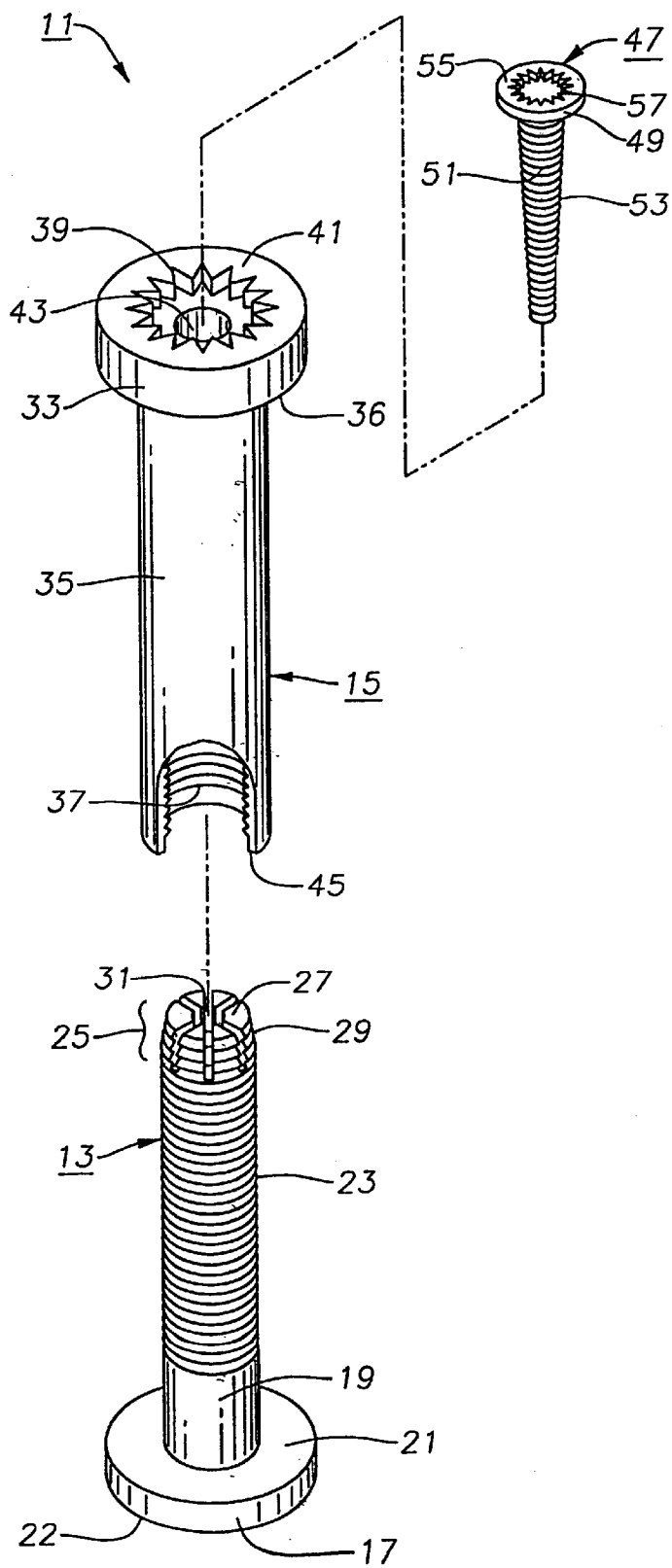
FIG. 1 is an exploded perspective view of an aerospace fastener constructed in accordance with the present invention.

Referring to FIG. 1, fastener 11 comprises a male section 13 and a female section 15. Male section 13 has a head 17 and an elongate cylindrical shaft 19 extending from the center of surface 21 of head 17. Head 17 has a tool connector profile (not shown) in a recess on surface 22 for rotating and tightening male section 13. Shaft 19 has external helical threads 23 that begin at the end of shaft 19 and extend toward head 17 for most of the length of shaft 19. The end of shaft 19 opposite head 17 is a castellated end 25, forming an array of segments 27, each segment having interrupted threads 29. Castellated end 25 has a central opening 31 in the center of the array of segments 27, opening 31 having internal threads. Segments 27 are defined by slots extending radially from the axis of shaft 19.

Female section 15 has a head 33 and a tubular elongate member 35 extending from surface 36 of head 33. Elongate member 35 of female section 15 has internal threads 37 for engaging threads 23 of male section 13. Head 33 of female section 15 has a high-torque tool-connector profile 39 recessed in surface 41 for receiving a tool used to rotate and tighten female section 15 on male section 13. Head 33 has a cylindrical hole 43 through the center of head 33 which opens into the center of member 35, hole 43 aligning with opening 31 of castellated end 25 when male section 13 is inserted into female section 15. When sections 13, 15 are fully assembled, lower surface 45 of female section 15 is preferably spaced from surface 21 of head 17 of male section 13. Hole 43 is in close proximity to opening 31 of male section 13.

A threaded lock screw 47 has a head 49 and a tapered shaft 51 extending from the center of head 49, shaft 51 having external threads 53 for engaging opening 31 of male section 13. Head 49 has a recess in surface 55 forming a tool connector 57 for receiving a tool used to rotate and tighten lock screw 47. The outer diameter of the portion of shaft 51 near head 49 is larger than the diameter of portion of shaft 51 opposite head 49, though the portion of shaft 51 near head 49 has a diameter less than the diameter of hole 43 of female section 15. Head 49 has a diameter greater than hole 43. The upper portion of shaft 51 is greater than the diameter of opening 31, creating an interference fit. After male section 13 is assembled with female section 15, screw 47 is inserted into hole 43 and rotated to cause threads 53 to engage the threads in opening 31. The taper of shaft 51 causes segments 27 of castellated end 25 to move radially outward.

To install fastener 11, shaft 19 of male section 13 is inserted into one end of an installation hole of the material (not shown) to be fastened, and member 35 of female section 15 is inserted in the other end of the installation hole. Shaft 19 of male section 13 is aligned with member 35 of female section 15, and castellated end 25 is inserted into member 35. Relative rotation of sections 13, 15 causes threads 23, 37 to engage and move shaft 19 into member 35 until surface 21 of male section 13 and surface 36 of female section 15 contact the surfaces of the material surrounding the installation hole. Sections 13, 15 are tightened to the proper torque for the material.

Lock screw 47 is then inserted into hole 43 and moved into contact with opening 31 of castellated end 25. Lock screw 47 is rotated to cause threads 53 to engage the threads in the interior of opening 31, moving shaft 51 of screw 47 into opening 31. The taper of shaft 51 forces segments 27 of castellated end 25 to permanently deform radially outward, causing a large normal force between threads 29 of segments 27 and threads 37 of member 35. This force results in a large frictional force, preventing relative rotation between male section 13 and female section 15.

To remove fastener 11, lock screw 47 is removed by rotating screw 47 to move shaft 51 out of opening 31, reducing the force on threads 29 as castellated segments 27 move radially inward. With enough force, male section 13 and female section 15 can then be rotated to cause shaft 19 to move out of female section 15. Sections 13, 15 can then be removed from the material.

Figure 2:
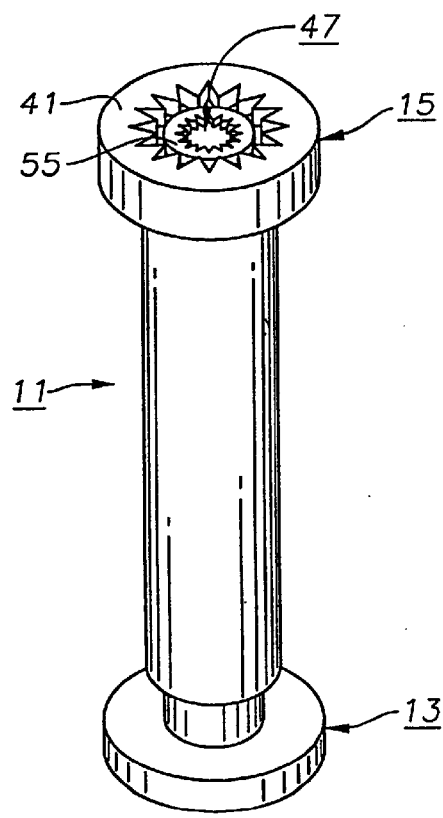
FIG. 2 is a perspective view of the aerospace fastener of FIG. 1 after assembly.

FIG. 2 shows fastener 11 as fully assembled. Male section 13 is inserted and tightened in female section 15, and lock screw 47 is inserted and tightened through hole 43 (FIG. 1) and into opening 31 (FIG. 1). Surface 55 of lock screw 47 is even with or below surface 41 of female section 15.

The fastener of the invention can be used for assembling longerons or other composite frame members of aircraft. The fastener locks to prevent loosening due to rotation. The fastener is removable.

While the invention has been shown in only one of its forms, it is not thus limited but is susceptible to various changes and modifications without departing from the spirit thereof Though not shown in the figures, one of the section may have an external profile adapted to engage a profile within the installation hole of the material for preventing rotation of that section, eliminating the need for having a tool connector on that section.

I claim:

1. A fastener, comprising:
   a first section having a head and a shaft extending from the head of the first section, the shaft having external helical threads and a castellated end opposite the head, the castellated end defining a plurality of segments, the segments surrounding a central cavity;
   a second section having a head and an elongated tubular portion extending from the head, the tubular portion having internal helical threads that receive the shaft of the first section; and
   a lock member having a threaded shaft extending from a head of the lock member, the head of the lock member having a larger diameter than the shaft of the lock member, the shaft of the lock member and the cavity having an interference fit, such that the shaft of the lock member engages and deforms the segments of the castellated end radially outward.

2. The fastener of claim 1, further comprising:
   a tool connector profile located on the head of the first section.

3. The fastener of claim 1, further comprising:
   a tool connector profile on the head of the second section.

4. The fastener of claim 1, further comprising:
   a head on the lock member; and
   a tool connector profile on the head of the lock member that is a recess in a surface of the head.

5. The fastener of claim 1, wherein:
   the shaft of the lock member is tapered.

6. The fastener of claim 1, wherein:
   the cavity of the first section is threaded.

7. A fastener, comprising:
   a first section having a head and a shaft extending from the head of the first section, the shaft having external helical threads and a distal end opposite the head that has a plurality of slots extending radially from a central cavity formed therein, the slots defining segments;
   a second section having a head and an elongated tubular member extending from the head of the second section, the head of the second section having a hole therethrough communicating an interior of the tubular member, the tubular member having internal helical threads that receive the shaft of the first section; and
   a lock screw having a head and a tapered, threaded shaft extending from the head of the lock screw that passes through the hole in the head of the second section into the cavity, the shaft of the lock screw having a portion that is larger in diameter than the cavity, thereby engaging and deforming the segments of the distal end radially outward.

8. The fastener of claim 7, further comprising:
   a recess with drive faces in a surface of the head of the first section for being engaged by a tool.

9. The fastener of claim 7, further comprising:
   a recess with drive faces in a surface of the head of the second section for being engaged by a tool.

10. The fastener of claim 7, further comprising:
    a recess with drive faces in a surface of the head of the lock screw for being engaged by a tool.

11. The fastener of claim 7, wherein:
    the head of the lock screw has a diameter larger than the diameter of the hole in the head of the second section.

12. The fastener of claim 7, wherein:
    the cavity of the first section is threaded.

13. A method for securing two objects, the method comprising:
    providing a first object and a second object, each object having at least one installation hole;
    assembling the objects and aligning the hole in one object with the hole in the other object;
    inserting a first section of a fastener into the installation hole in the first object, the first section having a head and a shaft extending from the head of the first section, the shaft having a castellated end opposite the head;
    inserting a second section of a fastener into the installation hole in the second object, the second section having a head and an elongated tubular member extending from the head of the second section;
    rotating one of the sections to engage external threads on the shaft of the first section with internal threads in the tubular member of the second section; and
    inserting a lock member into a hole in the head of the second section, the lock member having a threaded and tapered shaft for engaging and deforming segments of the castellated end radially outward.

* * * * *